United States Patent
Mori et al.

(10) Patent No.: US 7,333,017 B2
(45) Date of Patent: Feb. 19, 2008

(54) WIRELESS TAG READER AND WRITER

(75) Inventors: Hidekazu Mori, Mishima (JP); Hitoshi Adachi, Izu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 11/362,887

(22) Filed: Feb. 27, 2006

(65) Prior Publication Data

US 2006/0214797 A1    Sep. 28, 2006

(30) Foreign Application Priority Data

Mar. 25, 2005    (JP) ............................. 2005-089122

(51) Int. Cl.
*G08B 13/14*    (2006.01)

(52) U.S. Cl. ............................... 340/572.1; 340/572.8; 340/569; 340/10.51; 342/42

(58) Field of Classification Search ............. 340/572.1, 340/572.8, 572.2, 572.4, 572.7, 568.1, 10.42, 340/10.51, 569, 570; 235/451, 435, 440, 235/449, 385; 342/42, 44
See application file for complete search history.

(56) References Cited

U.S. PATENT DOCUMENTS 5,822,714 A * 10/1998 Cato .......................... 702/108
6,679,428 B2 * 1/2004 Miura et al. ................. 235/451
7,129,840 B2 * 10/2006 Hull et al. ............... 340/568.1
7,183,919 B2 * 2/2007 Wang ....................... 340/572.1

FOREIGN PATENT DOCUMENTS

JP    2005-267444    9/2005

* cited by examiner

*Primary Examiner*—Anh V. La
(74) *Attorney, Agent, or Firm*—Pearne & Gordon LLP

(57) ABSTRACT

A read and write box of a wireless tag reader and writer according to and embodiment of the invention has an open end and a closed end. Multiple envelopes each having a wireless tag at the end are inserted through the open end into the read and write box. The read and write box has a first read antenna and a second read antenna on the upper surface. The first read antenna detects wireless tags in a write area at the closed end; and the second read antenna detects wireless tags outside the write area. A write antenna is disposed at the closed end of the read and write box. The write antenna writes data to wireless tags. A step is formed on the lower surface of the read and write box in such a manner that the bottom of the write area is lower than the bottom adjacent to the open end so that the ends of the envelops align in the vicinity of the closed end.

4 Claims, 2 Drawing Sheets

WIRELESS TAG READER AND WRITER

CROSS-REFERENCE TO RELATED APPLICATION

This application is based upon and claims the benefit of priority from prior Japanese Patent Application No. 2005-089122, filed on Mar. 25, 2005, the entire contents of which are incorporated herein by reference.

BACKGROUND OF THE INVENTION

1. Field of the Invention

The present invention relates to wireless tag readers and writers having a read/write box in which documents with wireless tags is stored and in which information is read and written from/to the wireless tags.

2. Description of the Related Art

At delivery control and processing of mail including documents and envelopes, a large amount of mail can be processed at a time in such a manner that wireless tags are stuck to the mail, to which data including positional information on the channel of distribution is written, and the data is read through a read antenna. This technique is disclosed in, for example, Japanese Publication No. 11-175621.

To write or read data to/from wireless tags, wireless tag readers and writers having a read and write box for the objects to be controlled or processed having the wireless tags are used. The wireless tag reader and writer has a read antenna for reading the position of the wireless tags on the top of the read and write box, and starts writing with a write antenna when the wireless tags enter a normal writing area.

FIG. 1 is a side sectional view showing the schematic structure of the conventional wireless tag reader and writer. In the wireless tag reader and writer, specified pieces of mail 3 with wireless tags 2 are stacked in a read and write box 4 through an opening 1. The wireless tags 2 of the mail 3 stored are recognized by a read antenna 8 disposed on the top of the read and write box 4, wherein when the mail 3 is determined to be in a normal write area, data is written to the wireless tags 2 through a write antenna 5 disposed inside the read and write box 4.

In the conventional wireless tag reader and writers, when a specified amount of mail 3 heaps in the read and write box 4 for the mail 3 with the wireless tags 2 through the opening 1, the mail 3 is displaced toward the opening 1 because of the thickness of the wireless tags 2. The wireless tags 2 of several pieces of mail 3 therefore get out of the normal write area 6 of the write antenna 5, as shown in FIG. 1. This caused the problem that the wireless tags 2 outside the write area, as indicated by a triangle 7, are also recognized by the read antenna 8, to which data is written through the write antenna 5.

Even if the mail 3 does not get out of position, the foregoing problem has occurred because of the way operators put the mail 3, i.e., in the case where operators do not put the wireless tags 2 deep enough into the read and write box 4.

Furthermore, also when radio waves radiated from the read antenna are diffused or reflected by the other walls, the wireless tags outside the normal write area are received by the read antenna, posing the problem of hindering accurate position finding. Such events prevent normal writing to the wireless tags, taking the trouble of rewriting, or in the worst case, posing the problem that the subsequent processing is performed without writing.

BRIEF SUMMARY OF THE INVENTION

Accordingly, an advantage of the present invention is to provide a reader and writer capable of keeping the position of the wireless tags of heaped mail in a normal write area in the wireless tag read and write box, thus providing an accurate recognition of wireless tags.

To achieve the above advantage, one aspect of the present invention is to provide a wireless tag reader and writer including: a read and write box shaped like a substantially rectangular cross-section cylinder and having an open end and a closed end, for holding sheet-like objects each having a wireless tag at the end, the objects being inserted through the open end; a first read antenna disposed on the peripheral surface of the read and write box and in a write area set in a specified range from the closed end to the open end, for finding the position of wireless tags; a second read antenna disposed on the peripheral surface of the read and write box adjacent to the open end relative to the write area, for finding the position of wireless tags; a write antenna disposed at the closed end of the read and write box, for writing data to wireless tags; and a step formed on the lower surface of the read and write box in such a manner that the bottom of the write area is lower than the bottom adjacent to the open end.

According to an embodiment of the invention, the read and write box has a step on the lower surface, so that the ends of the sheet-like objects each having a wireless tag thereon fall down into the lower portion of the step by the gravity. As a result, the stacked sheet-like objects do not slide toward the open end of the read and write box to be held in the normal write area, thus allowing an accurate writing to wireless tags.

DETAILED DESCRIPTION OF THE INVENTION

Figure 1:
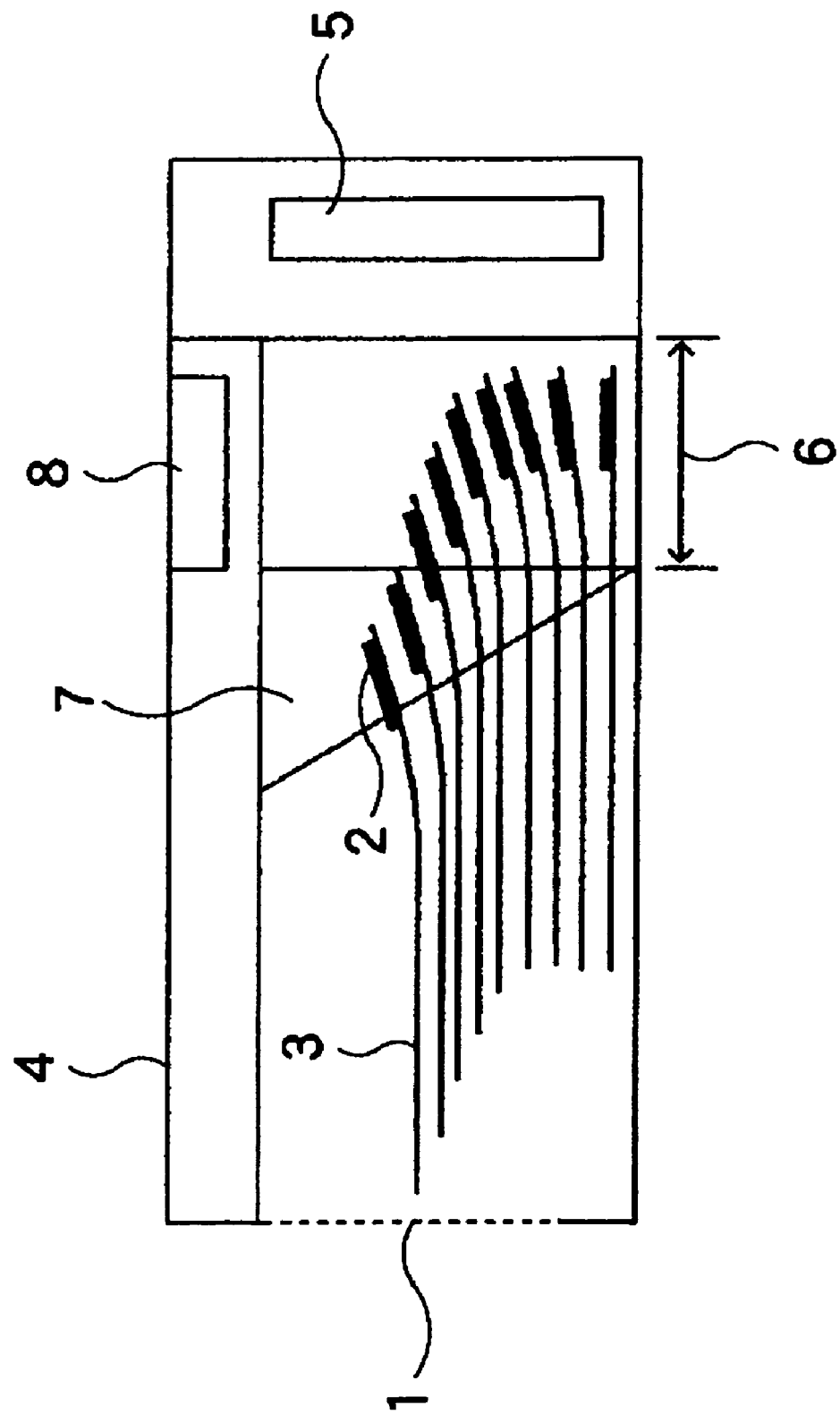
FIG. 1 is a side sectional view showing the structure of a conventional wireless tag reader and writer.
Figure 2:
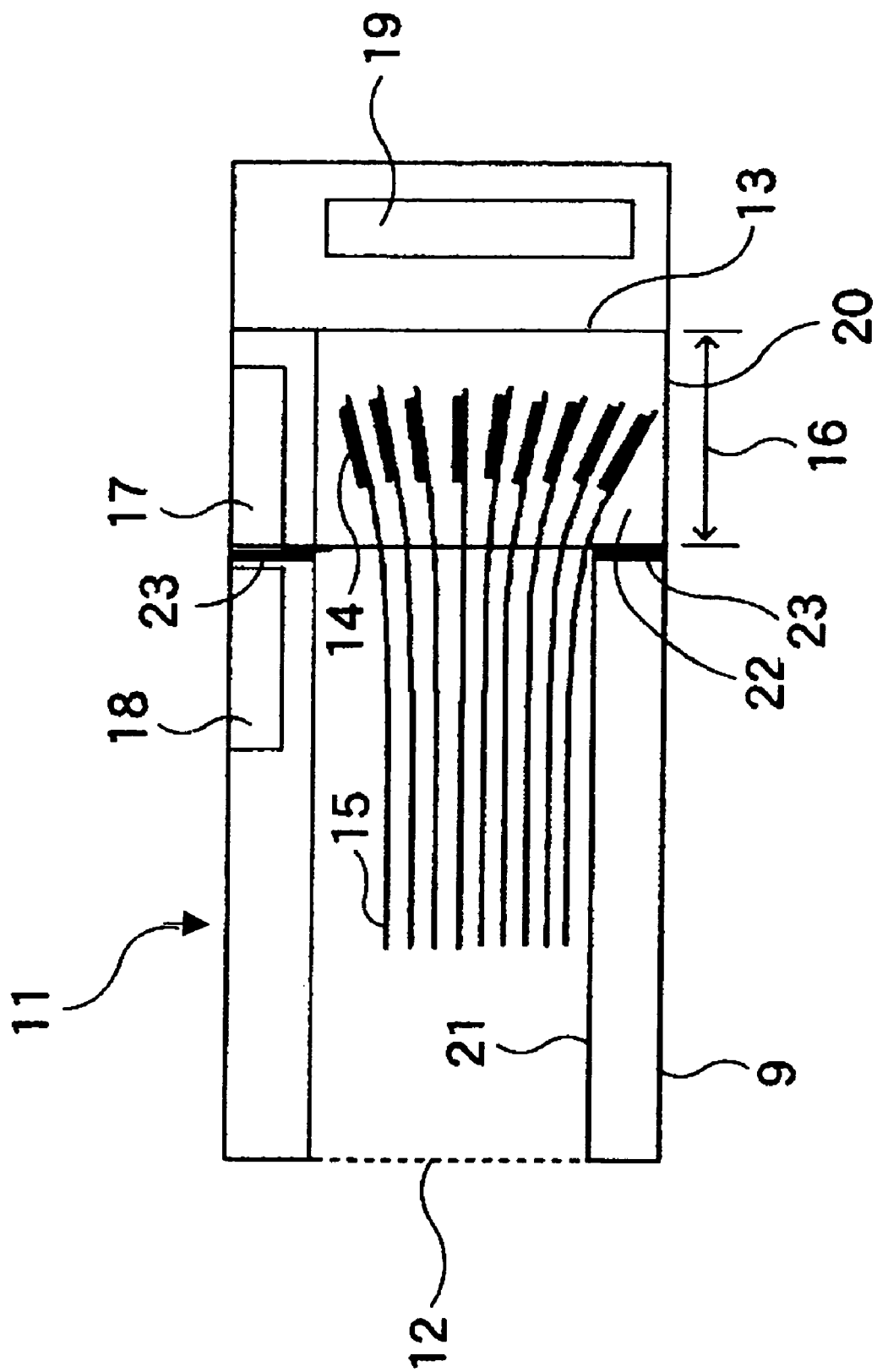
FIG. 2 is a side sectional view showing the structure of a wireless tag reader and writer according to an embodiment of the invention.

A wireless tag reader and writer according to an embodiment of the invention will be described hereinbelow with reference to FIG. 2. FIG. 2 is a side sectional view of the structure of the wireless tag reader and writer according to the embodiment of the invention. While the following description will be given using an envelope as mail, as an object with a wireless tag, the invention is not limited to that, but any other sheet-like articles may be used. The wireless tag reader and writer includes a read and write box 11 shaped like a cylinder of substantially rectangular cross section. The read and write box 11 has an open end 12 and a closed end 13. Multiple envelops 15 each having a wireless tag 14 at the end are inserted from the open end 12 and are stacked such that the ends align in the vicinity of the closed end 13. A write area 16 is set in a specified length of the read and write box 11 from the closed end 13 to the open end 12. A first read antenna 17 for finding the position of wireless tags is disposed on the peripheral surface of the read and write box 11 in the write area 16, for example, on the upper surface. A second read antenna 18 for finding the position of wireless tags is disposed on the upper surface of the read and write box adjacent to the open end 12 relative to the first read antenna 17. A write antenna 19 for writing data to wireless tags is disposed on the outer peripheral surface at the closed end 13 of the read and write box 11. A step 22 is provided on the lower surface of the read and write box 11, at which the bottom 20 of the write area 16 is lower than a bottom 21 adjacent to the open end 12. A radio-wave absorbing sheet 23 is disposed between the first read antenna 17 and the second read antenna 18 on the upper surface of the read and write box 11 and at the step 22 on the lower surface of the read and write box 11.

In this wireless tag reader and writer according to an embodiment of the invention, the envelops 15 with the wireless tags 14 are inserted into the read and write box 11 through the opening 12 by an operator. At that time, the first and second read antennas 17 and 18 are in active mode, with which the position of the wireless tags 14 stuck to the envelops 15 are found. When the ends of the envelops 15 inserted align in the vicinity of the closed end 13 of the read and write box 11 as shown, and thus the wireless tags 14 are present in the write area 16, only the first read antenna 17 receives a position signal, but the second read antenna 18 receives no position signal. In this case, it is determined that all the wireless tags 14 are present in the normal write area 16, and the read antennas 17 and 18 stops active mode. The write antenna 19 is then brought into active mode to start writing of control data including delivery destination to the wireless tags 14. After completion of the writing operation, the envelops 15 are taken out from the read and write box 11.

In this embodiment, the multiple envelops 15 stacked in the read and write box 11 become thicker at the ends having the wireless tags than at the other portion and as such, the ends fall down to the low bottom 20 of the step 22 by the gravity. As a result, the envelops 15 stacked do not slip out toward the open end 12 of the read and write box 11, so that the wireless tags 14 can be held in the normal write area, ensuring accurate writing to the wireless tags.

Even if the wireless tags 14 of some envelops 15 are present outside the normal write area 16 due to operators negligence or the like, the position of the wireless tags 14 is not erroneously found by the first read antenna but can be found by the second read antenna 18 because of the presence of the radio-wave absorbing sheet 23 between the first and second read antenna 17 and 18 and at the step 22 on the lower surface of the read and write box 11.

This prevents execution of the subsequent processing without a writing operation unlike the conventional arts, eliminating useless operations such as rewriting, allowing a significant increase in operation efficiency.

In case the wireless tags 14 are detected by the second read antenna 18, operators may be alarmed by warning means (not shown) such as flashing of lamps or sound to correct the position.

What is claimed is:

1. A wireless tag reader and writer comprising:
a read and write box shaped like a substantially rectangular cross-section cylinder and having an open end and a closed end, for holding sheet-like objects each having a wireless tag at the end, the objects being inserted through the open end;
a first read antenna disposed on the peripheral surface of the read and write box and in a write area set in a specified range from the closed end to the open end, for finding the position of wireless tags;
a second read antenna disposed on the peripheral surface of the read and write box adjacent to the open end relative to the write area, for finding the position of wireless tags;
a write antenna disposed at the closed end of the read and write box, for writing data to wireless tags; and
a step formed on the lower surface of the read and write box in such a manner that the bottom of the write area is lower than the bottom adjacent to the open end.

2. A wireless-tag reader and writer comprising:
a read and write box shaped like a substantially rectangular cross-section cylinder and having an open end and a closed end, for holding sheet-like objects each having a wireless tag at the end, the objects being inserted through the open end;
a first read antenna disposed on the upper surface of the read and write box and in a write area set in a specified range from the closed end to the open end, for finding the position of wireless tags;
a second read antenna disposed on the upper surface of the read and write box adjacent to the open end relative to the write area, for finding the position of wireless tags;
a write antenna disposed at the closed end of the read and write box, for writing data to wireless tags;
a step formed on the lower surface of the read and write box in such a manner that the bottom of the write area is lower than the bottom adjacent to the open end; and
a radio-wave absorbing sheet disposed between the first read antenna and the second read antenna, and at the step.

3. A wireless tag reader and writer comprising:
a read and write box shaped like a substantially rectangular cross-section cylinder and having an open end and a closed end, for holding sheet-like objects each having a wireless tag at the end, the objects being inserted through the open end;
a first read antenna disposed on the peripheral surface of the read and write box and in a write area set in a specified range from the closed end to the open end, for finding the position of wireless tags;
a second read antenna disposed on the peripheral surface of the read and write box adjacent to the open end relative to the write area, for finding the position of wireless tags;
a write antenna disposed at the closed end of the read and write box, for writing data to wireless tags;
a step formed on the lower surface of the read and write box in such a manner that the bottom of the write area is lower than the bottom adjacent to the open end; and
an alarm lamp lit up or blinked when the second read antenna detects the wireless tag.

4. A wireless tag reader and writer comprising:
a read and write box shaped like a substantially rectangular cross-section cylinder and having an open end and a closed end, for holding sheet-like objects each having a wireless tag at the end, the objects being inserted through the open end;
a first read antenna disposed on the peripheral surface of the read and write box and in a write area set in a specified range from the closed end to the open end, for finding the position of wireless tags;
a second read antenna disposed on the peripheral surface of the read and write box adjacent to the open end relative to the write area, for finding the position of wireless tags;
a write antenna disposed at the closed end of the read and write box, for writing data to wireless tags;
a step formed on the lower surface of the read and write box in such a manner that the bottom of the write area is lower than the bottom adjacent to the open end; and
a sound alarm beeping when the second read antenna detects the wireless tag.

* * * * *